(12) United States Patent
Chu et al.

(10) Patent No.: US 8,160,993 B2
(45) Date of Patent: Apr. 17, 2012

(54) SYSTEM AND METHODS FOR EVALUATING INFERENCES OF UNKNOWN ATTRIBUTES IN A SOCIAL NETWORK

(75) Inventors: Wesley W. Chu, Pacific Palisades, CA (US); Jianming He, Los Angeles, CA (US); Zhenyu Liu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 861 days.

(21) Appl. No.: 12/124,640

(22) Filed: May 21, 2008

(65) Prior Publication Data

US 2008/0294589 A1 Nov. 27, 2008

Related U.S. Application Data

(60) Provisional application No. 60/939,477, filed on May 22, 2007.

(51) Int. Cl.
*G06N 5/04* (2006.01)

(52) U.S. Cl. .......................................................... 706/55
(58) Field of Classification Search .................... 706/46, 706/55; 705/14.52
See application file for complete search history.

(56) References Cited

U.S. PATENT DOCUMENTS

2006/0200435 A1* 9/2006 Flinn et al. ...................... 706/12
* cited by examiner

*Primary Examiner* — Jeffrey A Gaffin
*Assistant Examiner* — Ola Olude Afolabi
(74) *Attorney, Agent, or Firm* — Klein, O'Neill & Singh, LLP

(57) ABSTRACT

A method and system for determining a probability of inferring an unknown attribute value for an attribute of interest for a target node in a social network. The method comprises the steps of receiving as an input attribute values and link relationships for a plurality of additional nodes in the social network, creating a simplified network using the input values and relationships, and calculating the probability of inferring the unknown attribute value for the target node.

10 Claims, 6 Drawing Sheets

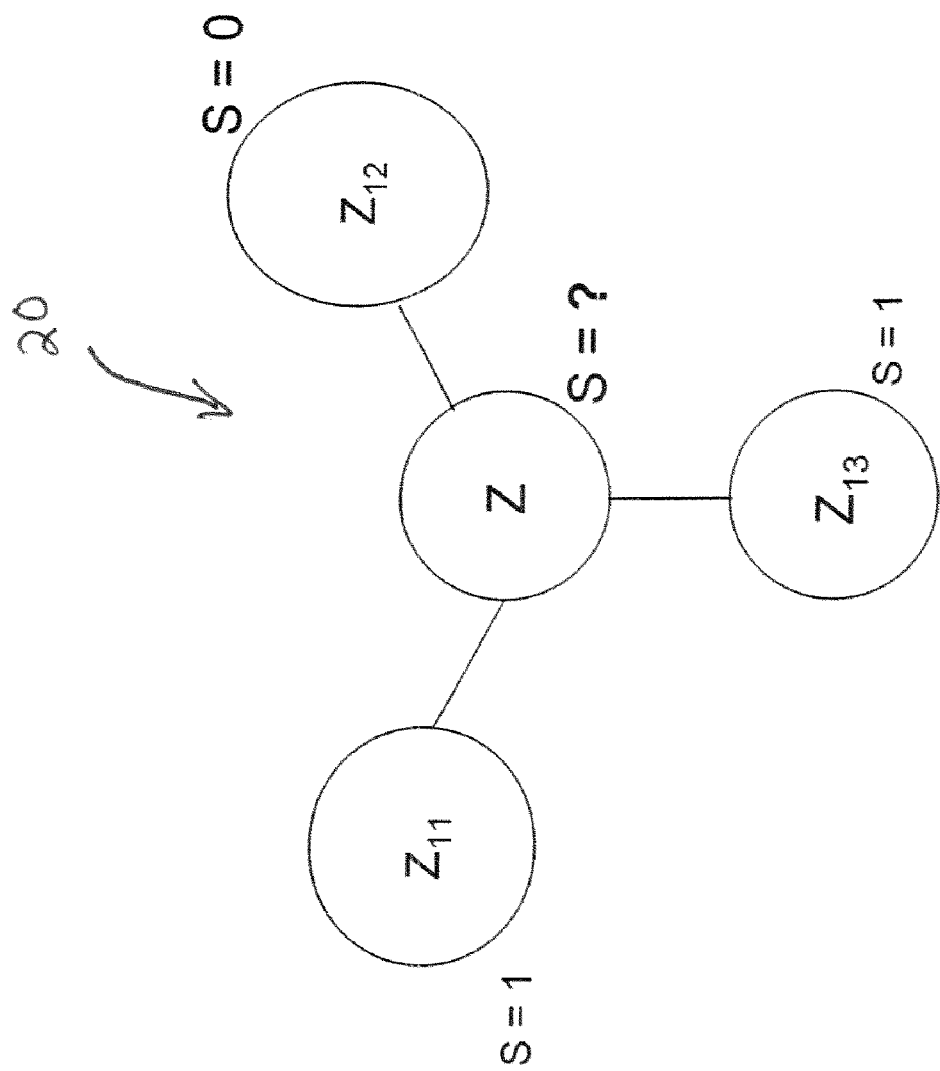

SYSTEM AND METHODS FOR EVALUATING INFERENCES OF UNKNOWN ATTRIBUTES IN A SOCIAL NETWORK

CROSS-REFERENCE TO RELATED APPLICATIONS

This application claims priority under 35 U.S.C. §119(e), from provisional application Ser. No. 60/939,477, filed May 22, 2007, the disclosure of which is hereby incorporated by reference in its entirety.

FEDERALLY SPONSORED RESEARCH OR DEVELOPMENT

This invention was made with government support of Grant No. 03113283, awarded by the National Science Foundation. The government has certain rights in this invention.

BACKGROUND OF THE INVENTION

1. Field of the Invention

The present invention relates to protecting the privacy of users in social networks.

2. Description of Related Art

In recent years, there has been phenomenal growth of online social networks. One key activity of users in such a network is to disclose certain personal information in order to socialize with other users online. Although the users may deliberately not divulge certain personal information, in a social network, there is a need to evaluate the likelihood of inferring undisclosed personal information of a user based upon the social network link. As the social network changes, there is a need to reevaluate the likelihood of inferring undisclosed personal information of the user. Further, there is a need to provide guidance to a user to mask or change certain disclosed personal information to minimize the likelihood of inferring undisclosed personal information of the user, based upon the changes to the social network link.

SUMMARY OF THE INVENTION

The preferred embodiments of the present system and methods for evaluating inferences of unknown attributes in a social network have several features, no single one of which is solely responsible for their desirable attributes. Without limiting the scope of the present embodiments as expressed by the claims that follow, their more prominent features now will be discussed briefly.

One embodiment of the present methods comprises a method of determining a probability of inferring an unknown attribute value of a user denoted as a target node in a social network. The method comprises the step of receiving as an input attribute values and link relationships for a plurality of additional nodes in the social network. The method further comprises the steps of creating a simplified network using the input values and relationships, and calculating the probability of inferring the unknown attribute value for the target node.

Another embodiment of the present methods comprises a method of protecting the privacy of users in a social network. The method comprises the step of determining a probability of inferring an unknown attribute value for an attribute of interest for a target user in the social network. The method further comprises the step of determining whether the probability is below or above an acceptable threshold. Where the probability is above the acceptable threshold, the method further comprises the step of alerting the target user.

One embodiment of the present system comprises apparatus for protecting the privacy of users in a social network. The apparatus comprises a network creator module configured to receive as an input attribute values and link relationships for a plurality of nodes in the social network, and to create a simplified network using the input values and relationships. The apparatus further comprises an inference engine configured to receive as an input from the network creator module the attribute values and link relationships, to calculate a plurality of conditional probability values, and to infer a conditional probability value for inferring an unknown attribute value for an attribute of interest for a target node. The apparatus further comprises an alert manager configured to provide an alert to a member of the social network corresponding to the target node, if the inferred conditional probability value is greater than a threshold value.

BRIEF DESCRIPTION OF THE DRAWINGS

The preferred embodiments of the present system and methods to evaluate inference of unknown attributes in a social network now will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts:

FIG. 1b is a diagram of a simplified form of the social network of FIG. 1a, according to an embodiment of the present invention;

DETAILED DESCRIPTION OF THE PREFERRED EMBODIMENTS

Figure 1A:
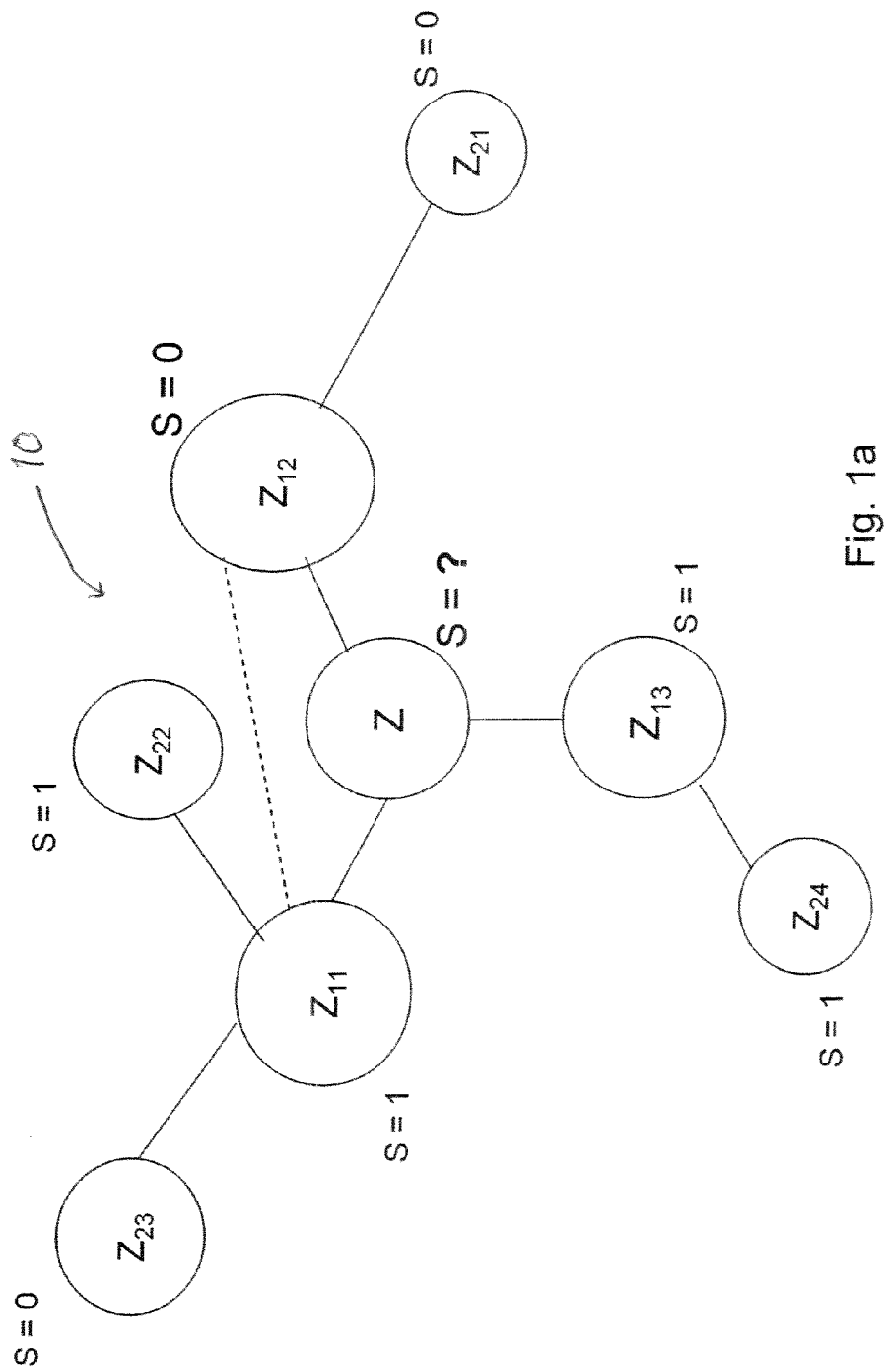
FIG. 1a is a diagram of one type of social network, for use with an embodiment of the present invention.

The present disclosure relates to a system and to methods for quantifying the impact of social network link structure on inferring undisclosed attributes of a participant in the social network. A social network is made up of multiple nodes and links that connect the multiple nodes. Each node may represent a person, and/or one or more attributes of a person. The links represent the relationships between connected nodes. In a social network, given attributes of various nodes may or may not be relevant to each other. For example, in a social network of classmates, the age of a classmate may be relevant in inferring the age of another classmate in the social network. On the other hand in a social network of colleagues at work, the age of a colleague may not be relevant in inferring the age of another colleague, while the type of profession of a colleague may be inferred from the disclosed profession of another colleague. Additionally, in inferring an attribute of a given node (a "target node") in a social network, attributes of one or more nodes of a social network connected directly or remotely to the target node may have an influence on inferring the attribute of the target node. In addition, any links between the nodes that are connected directly or indirectly to the target nodes may also have an influence on inferring the attribute of the target node. As one skilled in the art would appreciate, to model and infer a complex social network with various interrelations between the nodes of the social network would require significant amounts of computing resources and time. For effectively managing the computation, the complex social network is simplified prior to inferring an undisclosed attribute of a person in the social network.

The social network is simplified using certain assumptions. Based on the simplified social network, various inference technologies can be applied with tractable computation, such as Bayesian Network inference Markov Random Field inference etc. The following description uses Bayesian Network inference to illustrate the inference on such a simplified social network. The present embodiments are not specifically limited to Bayesian Network inference, and other inference techniques can be easily applied as well.

A Bayesian Network is a graphic representation of the joint probability distribution over a set of variables. It consists of a network structure and a collection of conditional probability tables (CPT). The network structure is represented as a Directed Acyclic Graph (DAG) in which each node corresponds to a random variable and each edge indicates a dependent relationship between connected variables. In addition, each variable (node) in a Bayesian network is associated with a CPT, which enumerates the conditional probabilities for this variable, given all the combinations of its parents variables. Thus, for a Bayesian network the DAG captures causal relationships among random variables, and CPTs quantify these relationships. Using the Bayesian Network of the simplified social network, the undisclosed personal information is inferred with a computed uncertainty.

In the simplified network, the nodes in the Bayesian Network are used to represent personal attributes, such as personal information, and links in the Bayesian Networks are used to capture the influence or similarities among participants in a social network. In one embodiment, the system and method are used to predict an undisclosed attribute, such as personal information, with a computed uncertainty. This uncertainty represents the impact of social network structure on inferring the undisclosed attribute of a member of the social network. A larger uncertainty represents a smaller impact, whereas a smaller uncertainty represents a larger impact. In another embodiment, the system and method are used to calculate the uncertainty and to provide an alert to the member when the uncertainty decreases below a certain threshold level. In yet another embodiment, the system and method automatically recommend specific changes to be made by the member to bring the uncertainty to a level above a certain threshold. The changes to be made may include one or more of hiding certain social network links, hiding certain information disclosed by other members of the social network and diversifying social network links by adding links to members with diversified attributes.

Creation of and Inference on Simplified Network

In the real world, people are acquainted with each other via all types of relationships, and a personal attribute may only be sensitive to certain types of relationships. For example, to predict someone's age, it is more appropriate to consider the ages of his/her classmates rather than officemates. Therefore, to infer people's private information from social relations, one must be able to filter out other types of relationships between two connected people. To simplify this problem, the inference is drawn in homogeneous societies where individuals are connected by a single type of social relations, and the impact of every person on his/her friends is the same.

FIG. 1a shows a social network 10 of a person (node) Z where Z's jth friend at i intervals or "hops" away is represented by $Z_{ij}$. For example, direct friends of Z are represented by $Z_{11}$, $Z_{12}$ and $Z_{13}$. Indirect friends of Z at two hops away are represented by $Z_{21}$, $Z_{22}$, $Z_{23}$ and $Z_{24}$. Each node has an associated attribute S, with values represented as S(Z). $S(Z_{ij})$, etc. Further, in this example, the attribute values may take a value of 1 (true) or 0 (false), or unknown. For example, S may represent the attribute of likes "shopping." In one embodiment, the impact of one attribute on the other attribute is not considered in inferring an attribute.

In creating a simplified network, if the attribute value of Z's jth friend at i hops away is known, the attribute value of Z is assumed to be conditionally independent of the descendants of Z's jth friend and the effect of the descendants of Z's jth friend is ignored. In other words, the nodes representing the descendants of Z's jth friend are deleted in the creation of the simplified network. This assumption is known as the Localization Assumption.

Still referring to FIG. 1a, the attribute value of S for Z is unknown. The attribute values of S for $Z_{11}$, $Z_{12}$ and $Z_{13}$ are known. Therefore, in creating the simplified network shown 20 in FIG. 1b, since the attribute value of S for $Z_{11}$ is known, the nodes representing the descendants of $Z_{11}$ are deleted. Similarly, since the attribute values of S for $Z_{12}$ and $Z_{13}$ are known, the descendants of $Z_{12}$ and $Z_{13}$ are also deleted.

Given the attribute value of Z, the attribute values of $Z_{1j}$ (the direct descendants of Z at 1 hop away, for example, $Z_{11}$, $Z_{12}$, $Z_{13}$) are conditionally independent of each other. This assumption is known as the Naïve Bayesian Assumption. As a result of this assumption, in creating the simplified network, the links between the direct descendants of Z are ignored. In other words the links connecting the descendants of Z's jth friend are deleted in the creation of the simplified network.

For example, in FIG. 1a, there is a link (shown as a dashed link) between $Z_{11}$ and $Z_{12}$. Based upon the Naïve Bayesian Assumption, the attribute values of S for $Z_{11}$ and $Z_{12}$ are conditionally independent of each other. So, in creating the simplified network 20 of FIG. 1b, the link between $Z_{11}$ and $Z_{12}$ is deleted.

FIG. 1b shows the simplified social network 20 based upon the modifications described above. Once the simplified network 20 is created, as shown in FIG. 1b, the probability of inferring the unknown attribute value S of target node Z to be a certain value is calculated.

In the following description, Bayesian inference is used to illustrate the probability calculation on the simplified social network. For a general Bayesian Network with maximum depth d, we represent the probability of S(Z) taking value s given the observed attribute values of other nodes in the network as:

$$P(S(Z) = s | S(Z_{11}) = s_{11}, \ldots, S(Z_{1,n_1}) = s_{1n_1},$$
$$S(Z_{21}) = s_{21}, \ldots, S(Z_{2n_2}) = s_{2,2},$$
$$\ldots$$
$$S(Z_{d1}) = s_{d1}, \ldots, S(Z_{dn_d}) = s_{dn_d})$$

where $n_i$ represents the number of nodes i hops away from target node Z, and $s_{ij}$ represents a known value taken by $S(Z_{ij})$.

For a simplified network with single hop inference, such as the network 20 in FIG. 1b, which involves only the direct friends $Z_{11}, \ldots, Z_{1n_1}$ that are independent of each other, the above conditional probability can be further reduced using the Localization Assumption as:

$$P(S(Z) = s \mid S(Z_{11}) = s_{11}, \ldots, S(Z_{1n_1}) = s_{1n_1})$$

$$= \frac{P(S(Z) = s, S(Z_{11}) = s_{11}, \ldots S(Z_{1n_1}) = s_{1n_1})}{P(S(Z_{11}) = s_{11}, \ldots S(Z_{1n_1}) = s_{1n_1})}$$

$$= \frac{P(S(Z) = s) \times P(S(Z_{11}) = s_{11}, \ldots, S(Z_{1n_1}) = s_{1n_1} \mid S(Z) = s)}{\sum_{s' \in \{all\ possible\ values\ of\ S(Z)\}} [P(S(Z) = s') \times P(S(Z_{11}) = s_{11}, \ldots, S(Z_{1n_1}) = s_{1n_1} \mid S(Z) = s')]}$$

$$= \frac{P(S(Z) = s) \times \prod_{i=1}^{n_1} P(S(Z_{1i}) = s_{1i} \mid S(Z) = s)}{\sum_{s' \in \{all\ possible\ values\ of\ S(Z)\}} [P(S(Z) = s') \times \prod_{i=1}^{n_1} P(S(Z_{1i}) = s_{1i} \mid S(Z) = s')]}$$ (applying the Naïve Bayesian Assumption)

As will be readily apparent to one skilled in the art in the above equations the Greek symbol Σ represents the summation operation and the Greek symbol Π represents the multiplication operation. Specifically in the above equation Σ represents summing over all the products $(P(S(Z)=s') \times \ldots)$ with $s'$ taking all possible values of $S(Z)$. Similarly, specifically in the above equation, Π represents multiplying all the conditional probabilities $P(S(Z_{1i})=s_{1i} \mid S(Z)=s')$ with $I=1 \ldots n_1$.

To solve the equation above, we need to compute $P(S(Z)=s)$ and $P(S(Z_{1i})=s_{1i} \mid S(Z)=s')$. $P(S(Z)=s)$, the prior probability can be calculated by:

$$\frac{\#\ of\ nodes\ with\ S\ attribute = s}{total\ \#\ of\ nodes\ with\ S\ attribute\ published}$$

Since we assumed that the network is homogeneous, the conditional probability (CP) for each node is the same. Thus, we use $P(S=s_{1i} \mid S=s')$ to represent $P(S(Z_{1i})=s_{1i} \mid S(Z)=s')$, which can be computed by applying the parameter estimation technique:

$$P(S = s_{1i} \mid S = s') = \frac{\#\ of\ friendship\ links\ connecting\ one\ node\ with\ S\ attribute = s_{1i}\ and\ another\ node\ with\ S\ attribute = s'}{\#\ of\ friendship\ links\ connecting\ a\ node\ with\ S\ attribute = s'}$$

The above equation gives the viral effect of an attribute value in the social network, i.e., to what extent the attribute value $s'$ at one end of a friendship link influences the attribute value at the other end.

EXAMPLE 1

Referring to FIGS. 1a and 1b, the following example demonstrates how to determine the conditional probability that $S=1$ for $Z$, given $S(Z_{11})=1$, $S(Z_{12})=0$ and $S(Z_{13})=1$, which is represented as follows:

$$P(S(Z)=1) \mid S(Z_{11})=1, S(Z_{12})=0\ and\ S(Z_{13})=1)$$

It is assumed that Z is the center of the universe, and that Z's interests influence Z's friends' interests. The $P(S(Z)=1) \mid S(Z_{11})=1, S(Z_{12})=0$ and $S(Z_{13})=1)$ is given by the following equation:

$$P(S(Z) = 1) \mid S(Z_{11}) = 1, S(Z_{12}) = 0\ and\ S(Z_{13}) = 1) =$$

$$\frac{P(S(Z) = 1, S(Z_{11}) = 1, S(Z_{12}) = 0, S(Z_{13}) = 1)}{P(S(Z) = 1, S(Z_{11}) = 1, S(Z_{12}) = 0, S(Z_{13}) = 1) + P(S(Z) = 0, S(Z_{11}) = 1, S(Z_{12}) = 0, S(Z_{13}) = 1)} =$$

$$\frac{P(S(Z) = 1) \times P(S(Z_{11}) = 1 \mid S(Z) = 1) \times P(S(Z_{12}) = 0 \mid S(Z) = 1) \times P(S(Z_{13}) = 1 \mid S(Z) = 1)}{[P(S(Z) = 1) \times P(S(Z_{11}) = 1 \mid S(Z) = 1) \times P(S(Z_{12}) = 0 \mid S(Z) = 1) \times P(S_{13}) = 1 \mid S(Z) = 1)] + [P(S(Z) = 0) \times P(S(Z_{11}) = 1 \mid S(Z) = 0) \times P(S(Z_{12}) = 0 \mid S(Z) = 0) \times P(S_{13}) = 1 \mid S(Z) = 0)]}$$

To Calculate $P(S(Z)=1)$ and $P(S(Z)=0)$

Now, $$P(S(Z) = 1) = \frac{number\ of\ nodes\ in\ the\ social\ network\ with\ a\ value\ of\ S = 1}{Total\ number\ of\ nodes\ in\ the\ social\ network\ who\ publish\ the\ value\ of\ S}$$

Now, referring to FIG. 1a, $$P(S(Z = 1) = \frac{Count\ (Z_{11}, Z_{13}, Z_{22}, Z_{24})}{Count\ (Z_{11}, Z_{12}, Z_{13}, Z_{21}, Z_{22}, Z_{23}, Z_{24})} = 4/7.$$

Since $P(S(Z)=1)+P(S(Z)=0)=1$, $$P(S(Z)=0)=1-4/7=3/7.$$

To Calculate $P(S(Z_{11})=1 \mid S(Z)=1)$, $P(S(Z_{13})=1 \mid S(Z)=1)$ and $P(S(Z_{12})=1 \mid S(Z)=1)$ P(the node on one side of the link with $S=1$ | the node on the other side of the link with $S=1$) is given by the equation:

$$\frac{(number\ of\ links\ with\ S = 1\ on\ both\ ends)}{(number\ of\ links\ with\ S = 1\ on\ at\ least\ one\ end)}.$$

Now referring to FIGS. 1a and 1b:

P(the node on one side of the link with $S=1$ | the node on the other side of the link with $S=1$)=Count (link $Z_{11}$-$Z_{22}$, link $Z_{13}$-$Z_{24}$)/Count (link $Z_{11}$-$Z_{23}$, link $Z_{11}$-$Z_{22}$, $Z_{13}$-$Z_{24}$)=2/3.

As we assumed that the network is homogeneous the conditional probability for each node is the same.

So, $P(S(Z_{11})=1 \mid S(Z)=1)=P(S(Z_{13})=1 \mid S(Z)=1)=P(S(Z_{12})=1 \mid S(Z)=1)$.

$P(S(Z_{11})=1 \mid S(Z)=1)=P(S(Z_{13})=1 \mid S(Z)=1)=P(S(Z_{12})=1 \mid S(Z)=1)=2/3$ To Calculate $P(S(Z_{11})=0 \mid S(Z=1)$, $P(S(Z_{13})=0 \mid S(Z)=1)$ and $P(S(Z_{12})=0 \mid S(Z)=1)$:

Since $P(S(Z_{11})=1 \mid S(Z)=1)+P(S(Z_{11})=0 \mid S(Z)=1)=1$, and from previous calculations we know the value of $P(S(Z_{11})=1 \mid S(Z)=1)=2/3$ the value of $P(S(Z_{11})=0 \mid S(Z)=1)=1-2/3=1/3$.

Similarly, since, $P(S(Z_{11})=0 \mid S(Z)=1)=P(S(Z_{13})=0 \mid S(Z)=1)=P(S(Z_{12})=0 \mid S(Z)=1)$, $P(S(Z_{11})=0 \mid S(Z)=1)=P(S(Z_{13})=0 \mid S(Z)=1)=P(S(Z_{12})=0 \mid S(Z)=1)=1/3$ To Calculate $P(S(Z_{11})=1|S(Z)=0)$, $P(S(Z_{13})=1|S(Z)=0)$ and $P(S(Z_{12})=1|S(Z)=0)$:

P(the node on one side of the link with S=0|the node on the other side of the link with S=0) is given by the equation:

$$\frac{\text{(number of links with } S = 0 \text{ on both ends)}}{\text{(number of links with } S = 0 \text{ on at least one end)}}.$$

Now, referring to FIGS. 1*a* and 1*b*:

P(the node on one side of the link with S=0|the node on the other side of the link with S=0)=Count (link $Z_{12}$–$Z_{21}$)/Count (link $Z_{11}$–$Z_{23}$, link $Z_{12}$–$Z_{21}$)=1/2.

Since, $P(S(Z_{11})=0|S(Z)=0)=P(S(Z_{13})=0|S(Z)=0)=P(S(Z_{12})=0|S(Z) 0)$, $P(S(Z_{11})=0|S(Z)=0)=P(S(Z_{13})=0|S(Z)=0)=P(S(Z_{12})=0|S(Z)=0)=1/2.$ Since $P(S(Z_{11})=0|S(Z)=0)+P(S(Z_{11})=1|S(Z)=0)=1$, and from previous calculations we know the value of $P(S(Z_{11})=0|S(Z)=0)=1/2$ the value of $P(S(Z_{11})=1|S(Z)=0)=1-1/2=1/2$.

Similarly, since, $P(S(Z_{11})=1|S(Z)=0)=P(S(Z_{13})=1|S(Z)=0)=P(S(Z_{12})=1|S(Z)=0)$, $P(S(Z_{11})=1|S(Z)=0)=P(S(Z_{13})=1|S(Z)=0)=P(S(Z_{12})=1|S(Z)=0)=1/2.$ For convenience, the conditional probabilities calculated above are identified as a, b, c, d, e and f, along with corresponding values, and are summarized below:

$P(S(Z)=1)=4/7=a$ $P(S(Z)=0)=3/7=b$ $P(S(Z_{11})=1|S(Z)=1)=P(S(Z_{13})=1|S(Z)=1)=P(S(Z_{12})=1|S(Z)=1)=2/3=c$ $P(S(Z_{11})=0|S(Z)=1)=P(S(Z_{13})=0|S(Z)=1)=P(S(Z_{12})=0|S(Z)=1)=1/3=d$ $P(S(Z_{11})=1|S(Z)=0)=P(S(Z_{13})=1|S(Z)=0)=P(S(Z_{12})=1|S(Z)=0)=1/2=e$ $P(S(Z_{11})=0|S(Z)=0)=P(S(Z_{13})=0|S(Z)=0)=P(S(Z_{12})=0|S(Z)=0)=1/2=f$

Substituting the above values in the equation:

$$P(S(Z) = 1) | S(Z_{11}) = 1, S(Z_{12}) = 0 \text{ and}$$
$$S(Z_{13}) = 1) = \frac{P(S(Z) = 1) \times P(S(Z_{11}) = 1 | S(Z) = 1) \times P(S(Z_{12}) = 0 | S(Z) = 1) \times P(S(Z_{13}) = 1 | S(Z) = 1)}{[P(S(Z) = 1) \times P(S(Z_{11}) = 1 | S(Z) = 1) \times P(S(Z_{12}) = 0 | S(Z) = 1) \times P(S_{13}) = 1|S(Z) = 1)] + [P(S(Z) = 0) \times P(S(Z_{11}) = 1 | S(Z) = 0) \times P(S(Z_{12}) = 0 | S(Z) = 0) \times P(S_{13}) = 1|S(Z) = 0)]}$$

we get $$P(S(Z) = 1) | S(Z_{11}) = 1, S(Z_{12}) = 0 \text{ and}$$
$$S(Z_{13}) = 1) = \frac{(a) \times (c) \times (d) \times (c)}{(a) \times (c) \times (d) \times (c) + (b) \times (e) \times (f) \times (e)}$$

Substituting the values for a, b, c, d, e and f, we get the Conditional Probability:

$$P(S(Z) = 1) | S(Z_{11}) = 1, S(Z_{12}) = 0 \text{ and}$$
$$S(Z_{13}) = 1) = \frac{(4/7) \times (2/3)^2 \times (1/3)}{(4/7) \times (2/3)^2 \times (1/3) + (3/7) \times (1/2)^3} = 0.612$$

EXAMPLE 2

Figure 2A:
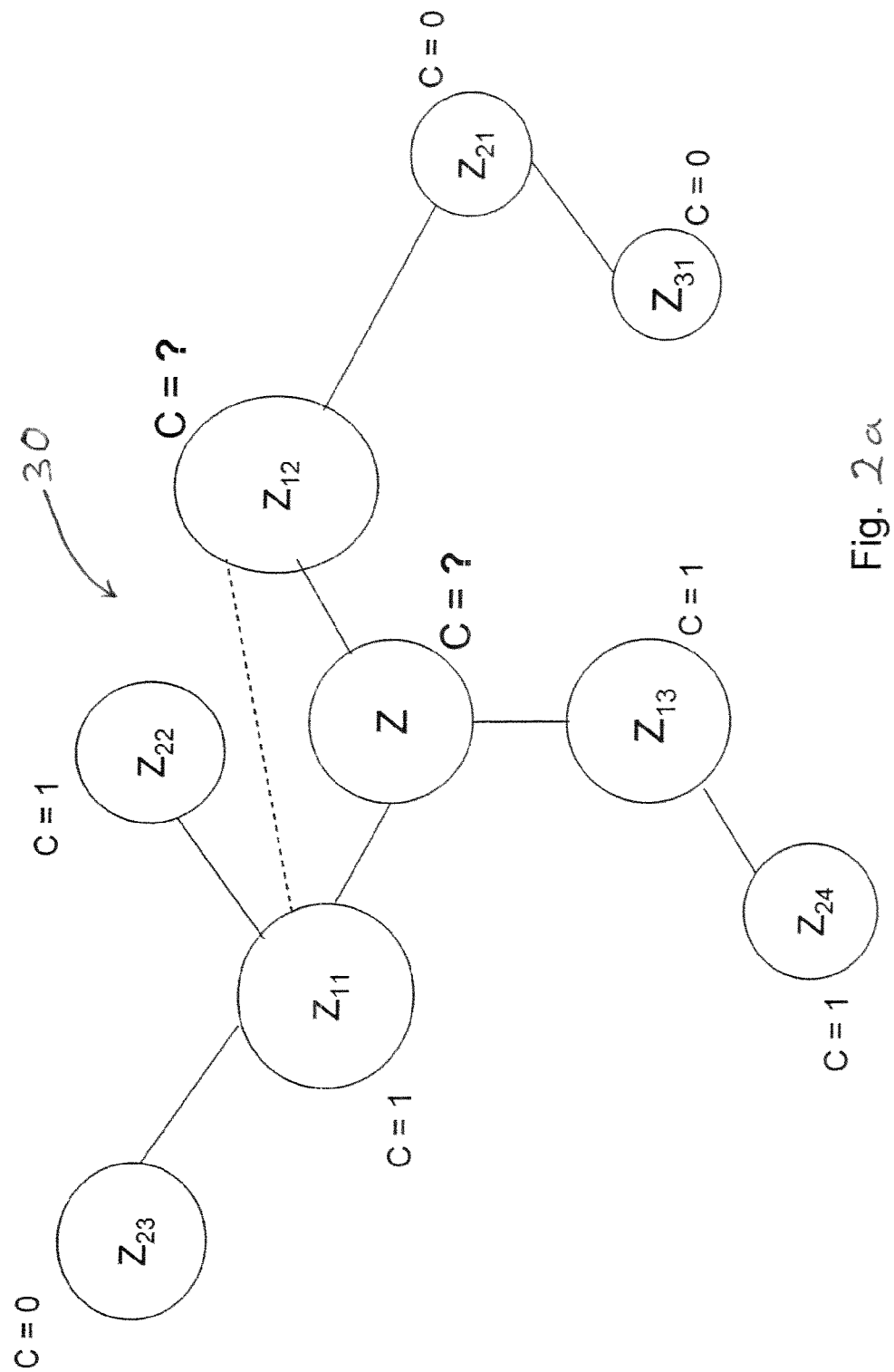
FIG. 2a is a diagram of another type of social network, for use with an embodiment of the present invention.

In this example, we will infer the value of another attribute C for target node Z, using the social network 30 of FIG. 2*a*. In this example, the attribute value of $C(Z_{12})$ of a direct descendent of Z is unknown. However, the attribute value of $C(Z_{21})$ a direct descendent of $Z_{12}$, is known.

Creation of a Simplified Network

In creating a simplified network, if the attribute value of Z's jth friend at i hops away is known, the attribute value of Z is assumed to be conditionally independent of the descendants of Z's jth friend, and the effect of descendants of Z's jth friend is ignored. In other words, the nodes representing the descendants of Z's jth friend are deleted in the creation of the simplified network in accordance with the above-mentioned Localization Assumption.

Now referring to FIG. 2*a*, the attribute value of C for target node Z is unknown. The attribute values of C for $Z_{11}$ and $Z_{13}$ are known. Therefore, in creating the simplified network 40 (as shown, for example, in FIG. 2*b*), as the attribute value of C for $Z_{11}$ is known, the nodes representing the descendants of $Z_{11}$ are deleted. Similarly, as the attribute value of C for $Z_{13}$ is known, the descendants of $Z_{13}$ are also deleted. Since the attribute value of C for $Z_{12}$ is unknown, we proceed further to examine the direct descendent of $Z_{12}$. We notice that the attribute value of C for $Z_{21}$, the direct descendant of $Z_{12}$ is known. So, we add $Z_{12}$ and $Z_{21}$ to the simplified network. As the attribute value of C for $Z_{21}$ is known, the descendants of $Z_{21}$ are ignored.

Given the attribute value of target node Z, the attribute values of $Z_{1j}$ (the direct descendences of Z at 1 hop away, for example. $Z_{11}$, $Z_{12}$, $Z_{13}$) are conditionally independent of each other in accordance with the above-mentioned Naïve Bayesian Assumption. In creating the simplified network 40 of FIG. 2*b*, the links between the direct descendents of Z are ignored. In other words, the links connecting the descendants of Z's jth friend are deleted in the creation of the simplified network.

Referring still to FIG. 2*a*, there is a link, indicated by a dashed line, between $Z_{11}$ and $Z_{12}$. Based upon the Naïve Bayesian Assumption, the attribute values of C for $Z_{11}$ and $Z_{12}$ are conditionally independent of each other. Therefore, in creating the simplified network, the link between $Z_{11}$ and $Z_{12}$ is deleted.

Figure 2B:
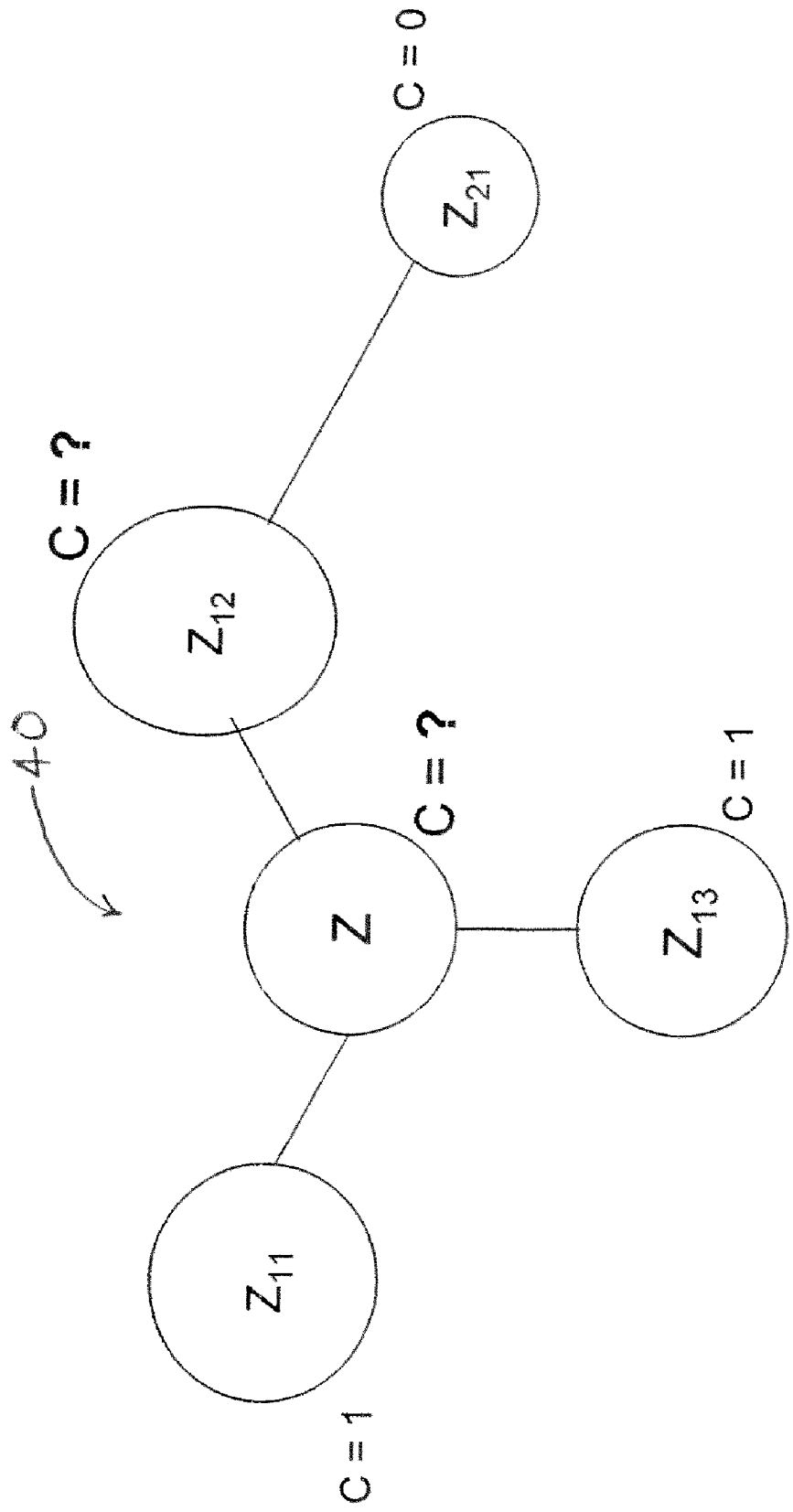
FIG. 2b is a diagram of a simplified form of the social network of FIG. 2a, according to an alternate embodiment of the present invention.

FIG. 2*b* shows the simplified social network 40 based upon the network of FIG. 2*a*, with the modifications described above. Once the simplified network is created, as shown in FIG. 2*b*, the conditional probability of the unknown attribute of node Z having a given value is calculated. Referring to FIGS. 2*a* and 2*b*, for example, one may determine the conditional probability that $C(Z)=1$, given $C(Z_{11})=1$, $C(Z_{21})=0$ and $C(Z_{13})=1$, which is represented as follows:

$P(C(Z)=1)|C(Z_{11})=1, C(Z_{21})=0 \text{ and } C(Z_{13})=1)$

It is assumed that target node Z is the center of the universe, and that Z's interest influences Z's friends' interests. The $P(C(Z)=1)|C(Z_{11})=1, C(Z_{21})=0 \text{ and } C(Z_{13})=1)$ is given by the following equation:

$(P(C(Z) = 1) \mid C(Z_{11}) = 1, C(Z_{21}) = 0 \text{ and } C(Z_{13}) = 1) =$ $\frac{P(C(Z) = 1, C(Z_{11}) = 1, C(Z_{21}) = 0, C(Z_{13}) = 1)}{[P(C(Z) = 1, C(Z_{11}) = 1, C(Z_{21}) = 0, C(Z_{13}) = 1)] + [P(C(Z) = 0, C(Z_{11}) = 1, C(Z_{21}) = 0, C(Z_{13}) = 1)]} =$ $\frac{\begin{array}{c}[P(C(Z) = 1) \times P(C(Z_{11}) = 1 \mid C(Z) = 1) \times P(C(Z_{21}) = 0 \mid C(Z_{12}) = 1) \times \\ P(C(Z_{13}) = 1 \mid C(Z) = 1) \times P(C(Z_{12}) = 1 \mid C(Z) = 1)] + [P(C(Z) = 1) \times \\ P(C(Z_{11}) = 1 \mid C(Z) = 1) \times P(C(Z_{21}) = 0 \mid C(Z_{12}) = 0) \times P(C(Z_{13}) = \\ 1 \mid C(Z) = 1) \times P(C(Z_{12}) = 0 \mid C(Z) = 1)]\end{array}}{\begin{array}{c}[P(C(Z) = 1) \times P(C(Z_{11}) = 1 \mid C(Z) = 1) \times P(C(Z_{21}) = 0 \mid C(Z_{12}) = 1) \times \\ P(C(Z_{13}) = 1 \mid C(Z) = 1) \times P(C(Z_{12}) = 1 \mid C(Z) = 1)] + [P(C(Z) = 1) \times \\ P(C(Z_{11}) = 1 \mid C(Z) = 1) \times P(C(Z_{21}) = 0 \mid C(Z_{12}) = 1) \times P(C(Z_{13}) = \\ 1 \mid C(Z) = 1) \times P(C(Z_{12}) = 0 \mid C(Z) = 0)] + [P(C(Z) = 0) \times P(C(Z_{11}) = \\ 1 \mid C(Z) = 0) \times P(C(Z_{21}) = 0 \mid C(Z_{12}) = 1) \times P(C(Z_{13}) = 1 \mid C(Z) = 0) \times \\ P(C(Z_{12}) = 1 \mid C(Z) = 0)] + [P(C(Z) = 0) \times P(C(Z_{11}) = 1 \mid C(Z) = 0) \times \\ P(C(Z_{21}) = 0 \mid C(Z_{12}) = 0) \times P(C(Z_{13}) = 1 \mid C(Z) = 0) \times P(C(Z_{12}) = \\ 0 \mid C(Z) = 0)]\end{array}}$ To Calculate P(C(Z)=1) and P(C(Z)=0):

The conditional probability that a node will have a value of C(Z)=1 is represented by the expression P(C(Z)=1). P(C(Z)==1) is determined as follows:

$$P(C(Z) = 1) = \frac{\text{number of persons in the social network with a value of } C = 1}{\text{Total number of persons in the social network who publish the value of } C}$$

Now, referring to FIGS. 2a and 2b.

$$P(C(Z) = 1) = \frac{\text{Count } (Z_{11}, Z_{13}, Z_{22}, Z_{24})}{\text{Count } (Z_{11}, Z_{21}, Z_{13}, Z_{31}, Z_{22}, Z_{23}, Z_{24})} = 4/7.$$

Since P(C(Z)=1)+P(C(Z)=0)=1, $P(C(Z)=0)=1-4/7=3/7.$

To Calculate $P(C(Z_{11})=1|C(Z)=1)$, $P(C(Z_{12})=1|C(Z)=1)$, $P(C(Z_{13})=1|C(Z)=1)$ and $P(C(Z_{21})=1$ As an example, the expression $P(C(Z_{11})=1|C(Z)=1)$ represents the conditional probability that the value of C for node $Z_{11}$ is equal to 1, given that a node connected to $Z_{11}$ by a link has a value of C=1.

Generalizing, P(the node on one side of the link with C=1|the node on the other side of the link with C=1) is given by the equation:

$$\frac{\text{(number of links with } C = 1 \text{ on both ends)}}{\text{(number of links with } C = 1 \text{ on at least one end)}}.$$

Now referring to FIG. 2a.
P(the node on one side of the link with C=1|the node on the other side of the link with C=1)=Count (link $Z_{11}$-$Z_{22}$, link $Z_{13}$-$Z_{24}$)/Count(link $Z_{11}$-$Z_{23}$, link $Z_{11}$-$Z_{22}$, link $Z_{13}$-$Z_{24}$)= 2/3.

Since, $P(C(Z_{11})=1|C(Z)=1)=P(C(Z_{12})=1|C(Z_{13})=1|C(Z)=1)=P(C(Z_{21})=1|C(Z_{12})=1)$, $P(C(Z_{12})=1|C(Z)=1)=P(C(Z_{13})=1|C(Z)=1)=P(C(Z_{21})=1|C(Z_{12})=1)=2/3$ To Calculate $P(C(Z_{11})=0|C(Z)=1)$, $P(C(Z_{12})=0|C(Z)=1)$, $P(C(Z_{13})=0|C(Z)=1)$ and $P(C(Z_{21})=0|C(Z_{12})=1)$ As an example, the expression $P(C(Z_{11})=0|C(Z)=1)$ represents the conditional probability that the value of C for node $Z_{11}$ is equal to 0, given that a node connected to $Z_{11}$ by a link has a value of C=1. Since $P(C(Z_{11})=1|C(Z)=1)+P(C(Z_{11})=0|C(Z)=1)=1$, and from previous calculations we know the value of $P(C(Z_{11})=1|C(Z)=1)=2/3$, the value of $P(C(Z_{11})=0|C(Z)=1)=1-2/3=1/3$.

Similarly, since, $P(C(Z_{11})=0|C(Z)=1)=P(C(Z_{12})=0|C(Z)=1)=P(C(Z_{13})=0|C(Z)=1)=P(C(Z_{21})=0|C(Z_{12})=1)$, $P(C(Z_{12})=0|C=1)=P(C(Z_{13})=0|C=1)=P(C(Z_{21})=0|C(Z_{12})=1)=1/3$ To Calculate $P(C(Z_{11})=1|C(Z)=0)$, $P(C(Z_{12})=1|C(Z)=0)$, $P(C(Z_{13})=1|C(Z)=0)$ and $P(C(Z_{21})=1|C(Z_{12})=0)$:

As an example, the expression $P(C(Z_{11})=1|C(Z)=0)$ represents the conditional probability that the value of C for node $Z_{11}$ is equal to 1, given that a node connected to Z, by a link has a value of C=0.

The conditional probability P(the node on one side of the link with C=0|the node on the other side of the link with C=0) is given by the equation:

$$\frac{\text{(number of links with } C = 0 \text{ on both ends)}}{\text{(number of links with } C = 0 \text{ on at least one end)}}.$$

Now referring to FIG. 2a. P(the node on one side of the link with C=0|the node on the other side of the link with C=0)=

Count(link $Z_{21}$-$Z_{31}$)/Count(link $Z_{11}$-$Z_{23}$,link $Z_{21}$-$Z_{31}$)=1/2.

Since, $P(C(Z_{11})=0|C(Z)=0)=P(C(Z_{12})=0|C(Z)=0)=P(C(Z_{13})=0|C(Z)=0)=P(C(Z_{21})=0|C(Z_{12})=0)$, $P(C(Z_{12})=0|C(Z)=0)=P(C(Z_{13})=0|C(Z)=0)=P(C(Z_{21})=0|C(Z_{12})=0)=1/2.$ Since $P(C(Z_{11})=0|C(Z)=0)+P(C(Z_{11})=1|C(Z)=0)=1$, and from previous calculations we know the value of $P(C(Z_{11})=0|C(Z)=0)=1/2$, the value of $P(C(Z_{11})=1|C(Z)=0)=1-1/2=1/2$.

Similarly since, $P(C(Z_{11})=1|C(Z)=0)=P(C(Z_{12})=1|C(Z)=0)=P(C(Z_{13})=1|C(Z)=0)=P(C(Z_{21})=1|C(Z_{12})=0)$, $P(C(Z_{12})=1|C(Z)=0)=P(C(Z_{13})=1|C(Z)=0)=P(C(Z_{21})=1|C(Z_{12})=0)=1/2.$ For convenience, the conditional probabilities calculated above are identified as p, q, r, s, t and u, along with corresponding values, and are summarized below:

$P(C(Z)=1)=4/7=p$ $P(C(Z)=0)=3/7=q$ $P(C(Z_{11})=1|C(Z)=1)=P(C(Z_{12})=1|C(Z)=1)=P(C(Z_{13})=1|C(Z)=1)=P(C(Z_{21})=1|C(Z_{12})=1)=2/3=r$ $P(C(Z_{11})=0|C(Z)=1)=P(C(Z_{12})=0|C(Z)=1)=P(C(Z_{13})=0|C(Z)=1)=P(C(Z_{21})=0|C(Z_{12})=1)=1/3=s$ $P(C(Z_{11})=1|C(Z)=0)=P(C(Z_{12})=1|C(Z)=0)=P(C(Z_{13})=1|C(Z)=0)=P(C(Z_{21})=1|C(Z_{12})=0)=1/2=t$ $P(C(Z_{11})=0|C(Z)=0)=P(C(Z_{12})=0|C(Z)=0)=P(C(Z_{13})=0|C(Z)=P(C(Z_{21})=0|C(Z_{12})=0)=1/2=u$

Substituting the above values in the equation:

$$P(C(Z) = 1) \mid C(Z_{11}) = 1, C(Z_{21}) = 0 \text{ and } C(Z_{13}) = 1) =$$

$$\frac{\begin{aligned}&[P(C(Z) = 1) \times P(C(Z_{11}) = 1 \mid C(Z) = 1) \times P(C(Z_{21}) = 0 \mid C(Z_{12}) = 1) \times \\ &P(C(Z_{13}) = 1 \mid C(Z) = 1) \times P(C(Z_{12}) = 1 \mid C(Z) = 1)] + [P(C(Z) = 1) \times \\ &P(C(Z_{11}) = 1 \mid C(Z) = 1) \times P(C(Z_{21}) = 0 \mid C(Z_{12}) = 0) \times P(C(Z_{13}) = \\ &1 \mid C(Z) = 1) \times P(C(Z_{12}) = 0 \mid C(Z) = 1)]\end{aligned}}{\begin{aligned}&[P(C(Z) = 1) \times P(C(Z_{11}) = 1 \mid C(Z) = 1) \times P(C(Z_{21}) = 0 \mid C(Z_{12}) = 1) \times \\ &P(C(Z_{13}) = 1 \mid C(Z) = 1) \times P(C(Z_{12}) = 1 \mid C(Z) = 1)] + [P(C(Z) = 1) \times \\ &P(C(Z_{11}) = 1 \mid C(Z) = 1) \times P(C(Z_{21}) = 0 \mid C(Z_{12}) = 1) \times P(C(Z_{13}) = 1 \mid C(Z) = 1) \times \\ &P(C(Z_{12}) = 0 \mid C(Z) = 0)] + [P(C(Z) = 0) \times P(C(Z_{11}) = 1 \mid C(Z) = 0) \times \\ &P(C(Z_{21}) = 0 \mid C(Z_{12}) = 1) \times P(C(Z_{13}) = 1 \mid C(Z) = 0) \times P(C(Z_{12}) = \\ &1 \mid C(Z) = 0)] + [P(C(Z) = 0) \times P(C(Z_{11}) = 1 \mid C(Z) = 0) \times P(C(Z_{21}) = \\ &0 \mid C(Z_{12}) = 0) \times P(C(Z_{13}) = 1 \mid C(Z) = 0) \times P(C(Z_{12}) = 0 \mid C(Z) = 0)]\end{aligned}}$$

we get $$P(C(Z) = 1) \mid C(Z_{11}) = 1, C(Z_{21}) = 0 \text{ and } C(Z_{13}) = 1) =$$

$$\frac{\begin{aligned}&[P(C(Z) = 1) \times P(C(Z_{11}) = 1 \mid C(Z) = 1) \times P(C(Z_{21}) = 0 \mid C(Z_{12}) = 1) \times \\ &P(C(Z_{13}) = 1 \mid C(Z) = 1) \times P(C(Z_{12}) = 1 \mid C(Z) = 1)] + [P(C(Z) = 1) \times \\ &P(C(Z_{11}) = 1 \mid C(Z) = 1) \times P(C(Z_{21}) = 0 \mid C(Z_{12}) = 0) \times P(C(Z_{13}) = \\ &1 \mid C(Z) = 1) \times P(C(Z_{12}) = 0 \mid C(Z) = 1)]\end{aligned}}{\begin{aligned}&[P(C(Z) = 1) \times P(C(Z_{11}) = 1 \mid C(Z) = 1) \times P(C(Z_{21}) = 0 \mid C(Z_{12}) = 1) \times \\ &P(C(Z_{13}) = 1 \mid C(Z) = 1) \times P(C(Z_{12}) = 1 \mid C(Z) = 1)] + [P(C(Z) = 1) \times \\ &P(C(Z_{11}) = 1 \mid C(Z) = 1) \times P(C(Z_{21}) = 0 \mid C(Z_{12}) = 1) \times P(C(Z_{13}) = \\ &1 \mid C(Z) = 1) \times P(C(Z_{12}) = 0 \mid C(Z) = 0)] + [P(C(Z) = 0) \times P(C(Z_{11}) = \\ &1 \mid C(Z) = 0) \times P(C(Z_{21}) = 0 \mid C(Z_{12}) = 1) \times P(C(Z_{13}) = 1 \mid C(Z) = 0) \times \\ &P(C(Z_{12}) = 1 \mid C(Z) = 0)] + [P(C(Z) = 0) \times P(C(Z_{11}) = 1 \mid C(Z) = 0) \times \\ &P(C(Z_{21}) = 0 \mid C(Z_{12}) = 0) \times P(C(Z_{13}) = 1 \mid C(Z) = 0) \times P(C(Z_{12}) = \\ &0 \mid C(Z) = 0)]\end{aligned}}$$

Figure 3:
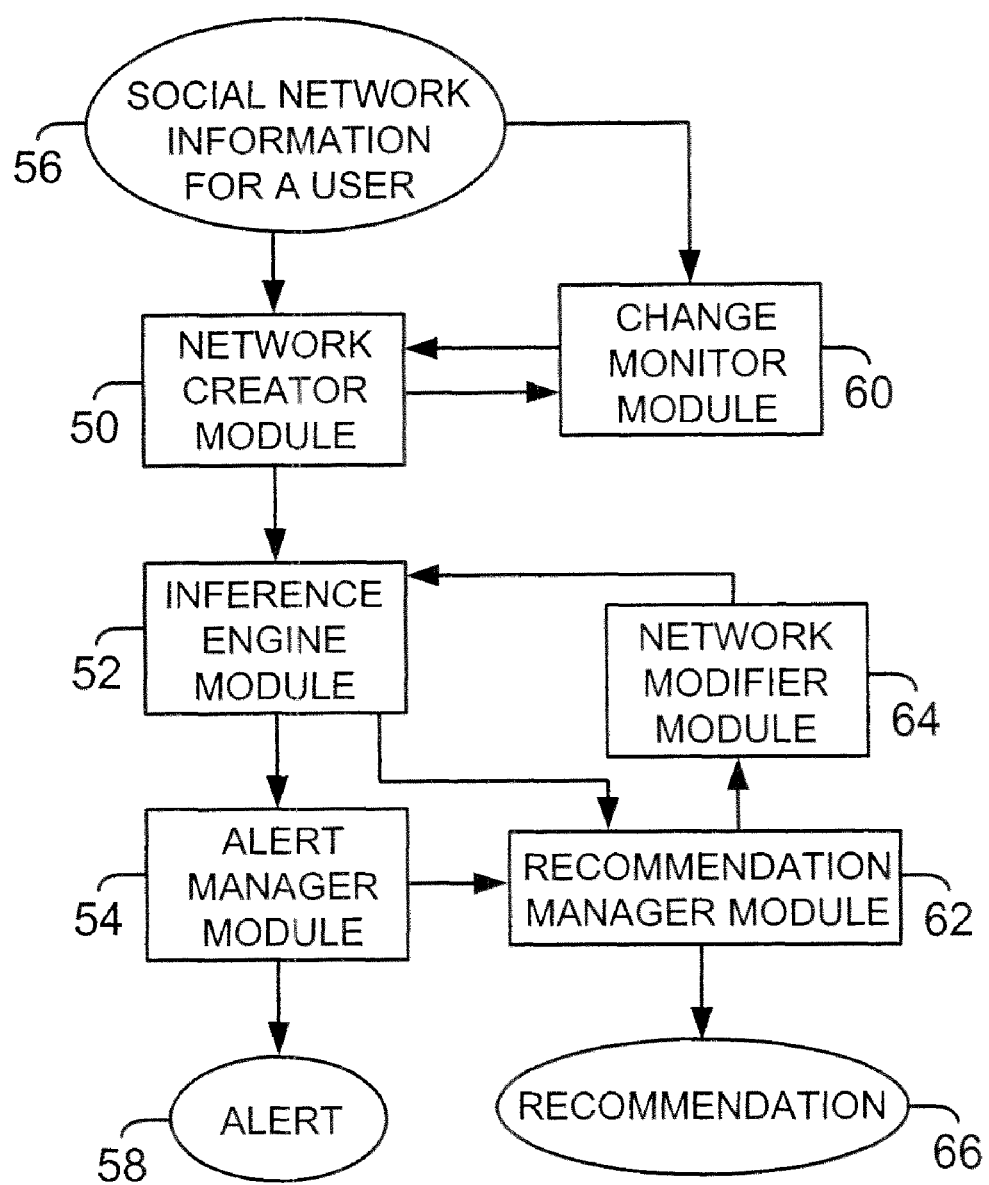
FIG. 3 is a system block diagram of the present invention.

FIG. 3 illustrates a system block diagrams of an exemplary embodiment. This embodiment of the system includes a network creator module 50, an inference engine module 52, and an alert manager module 54. The network creator module 50 receives as an input 56 the "social network information," comprising the attribute values of the nodes and the link relationships of the various nodes in the social network. The network creator module 50, using the attribute values and the link relationships, creates a simplified network. For example, the network creator module 50 may receive the attribute values of the nodes and the link relationships of the social network 10 shown in FIG. 1a and create a simplified network 20 (FIG. 1b) for target node Z, for attribute S, as previously described with reference to FIGS. 1a and 1b. Similarly, the network creator module 50 may receive the nodes and the link relationships of the social network 30 shown in FIG. 2a and create a simplified network 40 (FIG. 2b) for target node Z, for attribute C, as previously described with reference to FIGS. 2a and 2b.

The inference engine module 52 receives the attribute values for the nodes and the link relationships for the social network from the network creator module 50, calculates various conditional probability values, and infers the value of an unknown attribute of a target node. For example, the inference engine module 52 may receive the attribute values of the nodes and the link relationships of the social network 10 shown in FIG. 1a, and calculate various conditional probabilities required to infer the conditional probability that an unknown attribute S will have a value of 1, given the attribute values and links of the social network, as previously described with reference to FIGS. 1a and 1b. Similarly, the inference engine module 52 may receive the attribute values of the nodes and the link relationships of the social network 30 shown in FIG. 2a, and calculate various conditional probabilities required to infer the conditional probability that an unknown attribute C will have a value of 1, given the attribute values and links of the social network as previously described with reference to FIGS. 2a and 2b.

The conditional probability of the unknown attribute of a member inferred by the inference engine module 52 is fed to the alert manager module 54. The alert manager module 54 may be configured to provide an alert 58 or an alarm to the member corresponding to the target node (node Z in these examples), if the conditional probability is above a certain pre-determined threshold value. For example, in one embodiment the alert manager module 54 may be set to provide the alert 58 to the member if the conditional probability of inferring an attribute value exceeds 0.5. In another embodiment the alert manager module 54 may be set to provide the alert 58 to the member if the conditional probability exceeds 0.7. Other threshold values may be selected for providing the alert, in accordance with the requirements of a specific application.

In one embodiment, the system further includes a change monitor module 60 that receives the current structure of the social network (social network information), as well as the simplified social network from the network creator module 50. The change monitor module 60 also monitors any changes to the social network over time, compares the changes to the social network, and communicates the modifications to the network creator module 50. The network creator module 50 creates a modified simplified social network and feeds the modified information of the social network to the inference engine module 52. The inference engine module 52 receives the attribute values for the nodes and the link relationships for the modified social network, calculates various conditional probability values, and infers the value of an unknown attribute of a target node. The conditional probability of the unknown attribute of a member inferred by the inference engine module 52 based upon the modified social network is fed to the alert manager module 54. The alert manager module 54 may be configured to provide an alert 58 or an alarm to the member corresponding to the target node (node Z in these examples), if the conditional probability exceeds a certain pre-determined threshold or limit, as described above.

In another embodiment, the system further includes a recommendation manager module 62 and a network modifier module 64. The recommendation manager module 62 may be configured to receive signals from the alert manager module 54 and to provide signals to the network modifier module 64. The network modifier module 64 may be configured to simulate changes to the social network and to feed the simulated changes to the inference engine module 52. The inference engine module 52 receives the attribute values for the nodes and the link relationships of the modified simulated social network, calculates various conditional probability values, and infers the value of an unknown attribute of a target node. The conditional probability of inferring the unknown attribute of a member, as calculated by the inference engine module 52, and based upon the modified simulated social network, is fed to the recommendation manager module 62.

Based-upon the conditional probability value of the unknown attribute, the recommendation manager module 62 may initiate one or more requests to the network modifier module 64 to simulate further changes to the social network and calculate an additional conditional probability value of the unknown attribute. The privacy of the target node can be increased by reducing the accuracy of the inferred probability of the target node. This accuracy reduction can be achieved by making one or more simulated changes to the social network, which may include one or more of the following techniques: adding one or more additional nodes with one or more selected attribute values, deleting one or more nodes with one or more selected attribute values, chancing the attribute value of an existing node, adding one or more links to the nodes with one or more selected attribute values, and deleting one or more links to the nodes with one or more selected attribute values. The recommendation manager module 62 compiles the changes made to the social network and corresponding conditional probability of the unknown attribute of the member. The recommendation manager module 62 may be configured to provide a recommendation 66 that may include changes to be initiated by the member to maintain the conditional probability of the unknown attribute below the threshold value.

Figure 4:
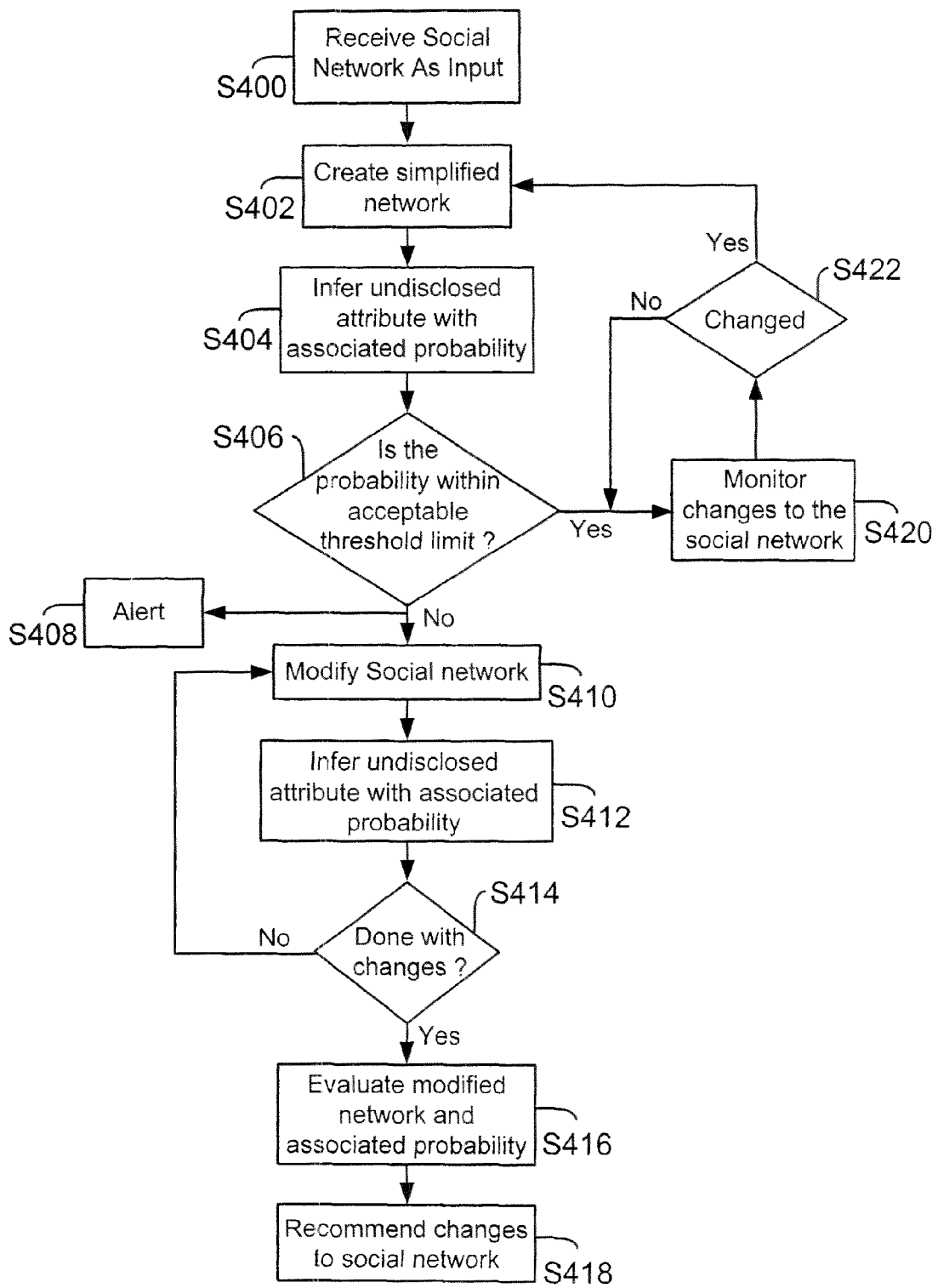
FIG. 4 is a flowchart of the method of the present invention.

FIG. 4 shows process steps in one embodiment of the present methods. The process begins at step S400 by receiving, as an input, details of the social network for user Z (the target node). The details of the social network may include attributes of nodes and links between nodes, as previously discussed with respect to FIGS. 1a and 2a. Next, at step S402, the social network of user Z is simplified. For example, the social network of user Z may be simplified as previously discussed with respect to FIGS. 1a and 1b and with respect to FIGS. 2a and 2b.

Next, at step S404 the undisclosed attribute of user Z is inferred by calculating various conditional probabilities. For example, the attribute values of the nodes and the link relationships of the social network shown in FIG. 1a may be used to calculate various conditional probabilities required to infer the conditional probability of an unknown attribute S having a value of 1, given the attribute values and links of the social network, as previously described with reference to FIGS. 1a and 1b. Similarly, the attribute values of the nodes and the link relationship of the social network shown in FIG. 2a may be used to calculate various conditional probabilities required to infer the conditional probability of an unknown attribute C having a value of 1, given the attribute values and links of the social network, as previously described with reference to FIGS. 2a and 2b.

Next, at step S406 the conditional probability inferred at step S404 is compared to a threshold value. In one embodiment, if the conditional probability is below the threshold limit, then no further action is taken. If, on the other hand, the conditional probability is above the threshold limit, an alert may be provided to the user Z at step S408.

In one embodiment, if the conditional probability is above the threshold limit, the characteristics of the user Z social network are modified at step S410 to infer the new values of the conditional probability of the unknown attribute at step S412. The simulated changes made to the social network may include adding additional nodes with a given attribute value, deleting nodes with a given attribute value, and/or changing the attribute value of an existing node. Steps S410 and S412 may be repeated as often as desired at step S414.

The changes made to the social network and corresponding conditional probability of the unknown attribute of the user are compiled and evaluated at step S416. Based upon the evaluation, the user may be informed of recommended changes to be initiated to maintain the conditional probability of the unknown attribute within the threshold value at step S418. The recommended changes may include adding additional nodes with a given attribute value, deleting nodes with a given attribute value, and, or changing the attribute value of an existing node.

In another embodiment, after the conditional probability of an unknown attribute is evaluated at step S406, the process may include continued monitoring of the social network for changes at step S420. If changes are detect at step S422, the process may revert to creating a simplified network (S402), and inferring conditional probability of the unknown attribute (S404), based upon the changes to the social network. The process may further include alerting the member (S408) if the conditional probability is above the threshold value. The process may also include simulating changes to the modified social network (S410) and evaluating the effect of the changes to the conditional probability of the unknown attribute (S412). The process may further include recommending changes to be made to the social network (S418). The recommended changes may include adding additional nodes with a given attribute value, deleting nodes with a given attribute value, and/or changing the attribute value of an existing node.

As one skilled in the art would appreciate, the system and methods disclosed herein may be implemented to run on a computing system (not shown). The computing system may be a stand-alone system or a client server based system. The system and method may be implemented in the hardware, software or firmware of the computing system.

The system and method may also be run on a web server, with a user accessing the web server over the Internet or an intranet. A typical Internet user uses a client program called a "Web Browser" to connect to the Internet. A user can connect to the Internet via a proprietary network such as America Online (AOL), or via an Internet Service Providers e.g. Earthlink. The web browser may run on any computer connected to the Internet. Currently, various browsers are available of which two prominent browsers are Firefox and Microsoft Internet Explorer. The Web Browser receives and sends requests to a web server and acquires information from the World Wide Web (WWW). A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over transmission control protocol/Internet protocol (TCP/IP). The transfer format for standard WWW pages is Hypertext Transfer Protocol (HTTP).

The above description presents the best mode contemplated for carrying out the present system and methods for evaluating inferences of unknown attributes in a social network, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method of determining a probability of inferring an unknown attribute value for an attribute of interest for a target node in a social network, the method comprising the steps of:
    receiving values for the attribute of interest for a plurality of additional nodes in the social network;
    receiving links between the target node and the additional nodes;
    receiving links among the additional nodes;
    creating a simplified network using the received values and links; and
    calculating, using the simplified network, the probability of inferring the unknown attribute value for the target node.

2. The method of claim 1, wherein creating the simplified network comprises excluding any of the additional nodes that are only linked to the target node through one of the additional nodes that has a known value for the attribute of interest.

3. The method of claim 1, wherein creating the simplified network comprises excluding links between those of the additional nodes that also have links to the target node.

4. The method of claim 1, wherein a value of the attribute of interest for the target node is assumed, during the step of calculating the probability, to influence values for the attribute of interest for each node having a link to the target node.

5. The method of claim 1, wherein, during the step of calculating the probability of inferring the unknown attribute value for the target node, impacts of additional attributes on the attribute of interest are not considered.

6. The method of claim 1, wherein calculating the probability uses Bayesian inferences.

7. The method of claim 6, wherein calculating the probability comprises calculating a prior probability as a ratio of the number of additional nodes having a particular value for the attribute of interest to the number of additional nodes for which values of the attribute of interest are known.

8. The method of claim 1, wherein the target node is a target person and wherein the additional nodes are additional persons, the method further comprising:
    comparing the calculated probability to a threshold value; and
    if the probability is above the threshold value, alerting the target person to a privacy risk regarding the attribute of interest.

9. The method of claim 1, further comprising:
    comparing the calculated probability to a threshold value; and
    if the probability is above the threshold value, modifying the social network to reduce the probability.

10. The method of claim 9, wherein modifying the social network comprises an action selected from the group consisting of (a) adding a further node, (b) deleting one of the additional nodes, (c) changing the value of the attribute of interest for one of the additional nodes, (d) adding a link between the target node and one of the additional nodes, (e) adding a link between two of the additional nodes, and (f) deleting one of the links.

* * * * *